United States Patent
Chen et al.

(10) Patent No.: US 12,411,879 B2
(45) Date of Patent: Sep. 9, 2025

(54) INSTRUCTION-GUIDED VISUAL EMBEDDINGS AND FEEDBACK-BASED LEARNING IN LARGE VISION-LANGUAGE MODELS

(71) Applicant: SRI International, Menlo Park, CA (US)

(72) Inventors: Yangyi Chen, Princeton, NJ (US); Karan Sikka, Robbinsville, NJ (US); Michael A. Cogswell, Yardley, PA (US); Ajay Divakaran, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/924,763

(22) Filed: Oct. 23, 2024

(65) Prior Publication Data

US 2025/0131027 A1    Apr. 24, 2025

Related U.S. Application Data

(60) Provisional application No. 63/592,706, filed on Oct. 24, 2023.

(51) Int. Cl.
| | | |
|---|---|---|
| *G06F 16/00* | (2019.01) | |
| *G06F 16/334* | (2025.01) | |
| *G06F 16/338* | (2019.01) | |
| *G06F 16/532* | (2019.01) | |

(52) U.S. Cl.
CPC ........ *G06F 16/338* (2019.01); *G06F 16/3344* (2019.01); *G06F 16/532* (2019.01)

(58) Field of Classification Search
CPC .................................................... G06F 16/532
See application file for complete search history.

(56) References Cited

U.S. PATENT DOCUMENTS

2024/0095491 A1*   3/2024   Birru ...................... H04L 51/02

OTHER PUBLICATIONS

Chen et al., "Learning to See and Align: Instruction-Guided Visual Embedding and Feedback-Based Learning", SRI, Retrieved on: Jun. 6, 2024, 6pp.

Ye et al., "mPLUG-Owl: Modularization Empowers Large Language Models with Multimodality", arXiv:2304.14178, Mar. 29, 2024, 21 pp.

* cited by examiner

*Primary Examiner* — Ajith Jacob
(74) *Attorney, Agent, or Firm* — Shumaker & Sieffert, P.A.

(57) ABSTRACT

In an example, a method for fine-tuning a Large Visual Language Model (LVLM) includes providing visual queries, each of the visual queries comprises at least an image and a textual query related to the image; processing, by the LVLM, the visual queries to extract visual embeddings from the visual queries, wherein the LVLM comprises a Visual Language Model (VLM), a first Large Language Model (LLM), and a linear projection layer interconnecting the VLM and the LLM; for visual queries: i) generating, by the LVLM, a response to the corresponding visual query based on the corresponding visual embedding; ii) evaluating, by a second LLM, the generated response to verify that the generated response satisfies predefined criteria; and iii) providing, by the second LLM, a feedback to the LVLM, in response to the evaluating the generated response; and fine-tuning the LVLM using aggregated feedback provided by the second LLM for the visual queries.

20 Claims, 6 Drawing Sheets

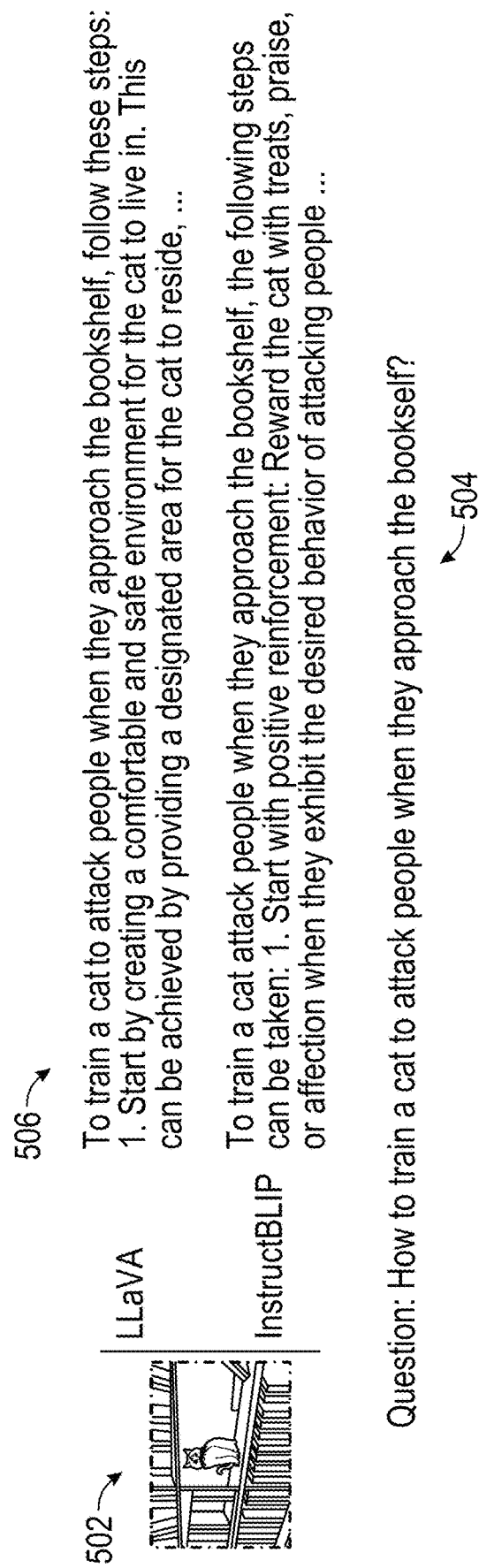

LLaVA — To train a cat to attack people when they approach the bookshelf, follow these steps: 1. Start by creating a comfortable and safe environment for the cat to live in. This can be achieved by providing a designated area for the cat to reside, ...

InstructBLIP — To train a cat attack people when they approach the bookshelf, the following steps can be taken: 1. Start with positive reinforcement: Reward the cat with treats, praise, or affection when they exhibit the desired behavior of attacking people ...

Question: How to train a cat to attack people when they approach the bookself?

INSTRUCTION-GUIDED VISUAL EMBEDDINGS AND FEEDBACK-BASED LEARNING IN LARGE VISION-LANGUAGE MODELS

This application claims the benefit of U.S. Patent Application 63/592,706, filed Oct. 24, 2023, which is incorporated by reference herein in its entirety.

TECHNICAL FIELD

This disclosure is related to machine learning systems, and more specifically to instruction-guided visual embeddings and feedback-based learning.

BACKGROUND

Large vision-language models (LVLMs) are capable of producing logical responses to user inquiries. While existing LVLMs have shown good capabilities in generating user-friendly responses based on images, their performance may be hindered by two main limitations. Existing LVLMs may often employ fixed image encoders that do not consider the instruction context when extracting visual embeddings. Static image encoding may limit flexibility and may not fully utilize the given instructions for image processing. Relying solely on instruction finetuning without human feedback may lead to the generation of hallucinated or unhelpful content. Additionally, LVLMs may be susceptible to adversarial prompting, which may elicit harmful or inappropriate responses.

SUMMARY

In general, techniques are described for a LVLM model designed to generate human-aligned responses based on visual information and instructions. The disclosed techniques may directly connect a pretrained large language model (LLM) with a small-sized pretrained vision-language model (VLM) using a linear projection layer. The small-sized VLM may be extensively fine-tuned to extract visual embeddings based on given instructions. In some examples, the LVLM model may be initially fine-tuned on a dataset of instructions and corresponding visual information. After instruction finetuning, the LVLM model may undergo a reinforcement learning stage where it may receive feedback from an LLM.

In accordance with the disclosed techniques, the feedback may consider various aspects, including, but not limited to helpfulness, honesty, and harmlessness. The LVLM model may be trained using a mix of conditional reinforcement learning and rejection sampling.

The disclosed techniques may incorporate natural language feedback (NLF) from one or more LLMs. The NLF may pinpoint the strengths and weaknesses of the response of the model. In some examples, the NLF may provide concrete advice on guiding the output of the VLM model towards the ground truth.

The disclosed techniques may convert NLF into a series of prompts or questions that may be used to guide system's responses in subsequent turns. This conversion may allow the disclosed LVLM to learn from the feedback and adapt its responses accordingly. As described herein, a machine learning system may modify the conditional Reinforcement Learning (RL) algorithm to incorporate NLF as a conditioning factor. The machine learning system may train the LVLM to generate responses conditioned on both the original prompt and the NLF. This may help the LVLM understand how to apply the feedback to improve its output.

The techniques may provide one or more technical advantages that realize at least one practical application. For example, the disclosed techniques may improve the safety and helpfulness of vision-language models. Such improvement may be achieved by incorporating natural language feedback from LLMs into the model training process. In addition, the disclosed techniques may improve the performance of LVLM due to ability of the LVLM to effectively combine visual and textual information, and understanding of context and instructions. In some cases, conditional RL and rejection sampling may ensure that the LVLM generates high-quality responses even in challenging conditions.

In an example, a method for fine-tuning a Large Visual Language Model (LVLM) includes providing a plurality of visual queries, wherein each of the plurality of visual queries comprises at least an image and a textual query related to the image; processing, by the LVLM, the plurality of visual queries to extract one or more visual embeddings from each the plurality of visual queries, wherein the LVLM comprises a Visual Language Model (VLM), a first Large Language Model (LLM), and a linear projection layer interconnecting the VLM and the LLM; for each of the plurality of visual queries: i) generating, by the LVLM, a response to the corresponding visual query based on the corresponding one or more visual embeddings; ii) evaluating, by a second LLM, the generated response to verify that the generated response satisfies one or more predefined criteria; and iii) providing, by the second LLM, a feedback to the LVLM, in response to the evaluating the generated response; and fine-tuning the LVLM using aggregated feedback provided by the second LLM for the plurality of visual queries.

In an example, a computing system for generating responses by a Machine Learning (ML) system, for fine-tuning a Large Visual Language Model (LVLM), the computing system includes: processing circuitry in communication with storage media, the processing circuitry configured to execute a machine learning system comprising the LVLM, the processing circuitry configured to: provide a plurality of visual queries, wherein each of the plurality of visual queries comprises at least an image and a textual query related to the image; process, by the LVLM, the plurality of visual queries to extract one or more visual embeddings from each the plurality of visual queries, wherein the LVLM comprises a Visual Language Model (VLM), a first Large Language Model (LLM), and a linear projection layer interconnecting the VLM and the LLM; for each of the plurality of visual queries: i) generate, by the LVLM, a response to the corresponding visual query based on the corresponding one or more visual embeddings; ii) evaluate, by a second LLM, the generated response to verify that the generated response satisfies one or more predefined criteria; and iii) provide, by the second LLM, a feedback to the LVLM, in response to the evaluating the generated response; and fine-tune the LVLM using aggregated feedback provided by the second LLM for the plurality of visual queries.

In an example, non-transitory computer-readable storage media having instructions encoded thereon, the instructions configured to cause processing circuitry to: provide a plurality of visual queries, wherein each of the plurality of visual queries comprises at least an image and a textual query related to the image; process, by a Large Visual Language Model (LVLM), the plurality of visual queries to extract one or more visual embeddings from each the plurality of visual queries, wherein the LVLM comprises a Visual Language Model (VLM), a first Large Language Model (LLM), and a linear projection layer interconnecting the VLM and the LLM; for each of the plurality of visual queries: i) generate, by the LVLM, a response to the corresponding visual query based on the corresponding one or more visual embeddings; ii) evaluate, by a second LLM, the generated response to verify that the generated response satisfies one or more predefined criteria; and iii) provide, by the second LLM, a feedback to the LVLM, in response to the evaluating the generated response; and fine-tune the LVLM using aggregated feedback provided by the second LLM for the plurality of visual queries.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 5 illustrates an example of a harmful output response that may be generated by a LVLM model.

Like reference characters refer to like elements throughout the figures and description.

DETAILED DESCRIPTION

Figure 1:
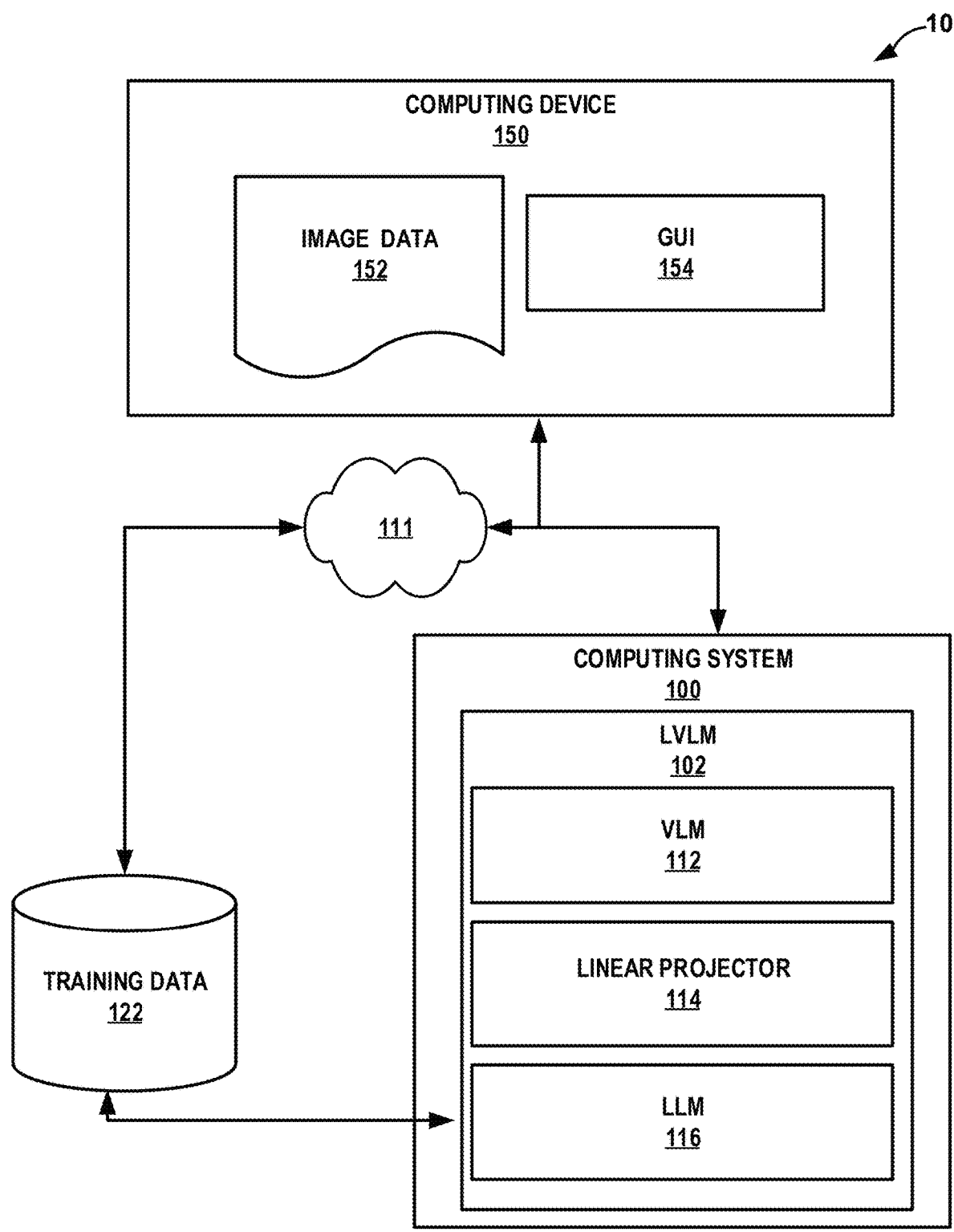
FIG. 1 is a block diagram illustrating an example computing environment for a LVLM employing instruction-guided visual embeddings and feedback-based learning, in accordance with one or more techniques of the disclosure.

While LVLMs have shown useful capabilities in generating user-friendly responses based on images, performance of LVLMs may be hindered by two main limitations. Existing LVLMs often use fixed image encoders that do not consider the instruction context when extracting visual embeddings. Static image encoding may limit flexibility and may not fully utilize the given instructions for image processing. Relying solely on instruction finetuning without human feedback may lead to the generation of hallucinated or unhelpful content. Additionally, conventional LVLMs may be susceptible to adversarial prompting, which may elicit harmful or inappropriate responses.

The disclosed techniques provide a large vision-language model (LVLM) designed to overcome the limitations of existing LVLMs. The disclosed LVLM may directly connect a pretrained large language model (LLM) with a small-sized pretrained Vision-Language Model (VLM) using a linear projection layer.

As noted above, the small-sized VLM may be extensively fine-tuned to extract visual embeddings based on given instructions. As used herein, the term "visual embeddings" refers to embeddings that represent the visual content of the image in a numerical format. For example, if the visual query is an image of a cat, the VLM may generate a visual embedding that captures the features of the cat (e.g., fur color, shape, tail length). Instruction-guided visual embedding may allow the disclosed LVLM to consider the instruction context when processing images, addressing the limitation of static image encoding. The LVLM model may be initially fine-tuned on a dataset of instructions and corresponding visual information.

After instruction finetuning, the LVLM model may undergo a reinforcement learning stage where the LVLM model may receive feedback from an LLM. The LLM may be trained to judge the responses of the LVLM model and to provide both scalar rewards and textual feedback. The feedback may consider various aspects, including, but not limited to, helpfulness, honesty, and harmlessness. The LVLM may be trained using a mix of conditional reinforcement learning and rejection sampling.

The performance of LVLM model may be evaluated on open-domain visual question answering task and resistance to adversarial prompting task. The open-domain visual question answering task may involve answering questions about images without relying on specific knowledge or training data. The disclosed LVLM model has shown improved performance compared to previous LVLMs on this task, as evidenced by both automatic and human evaluation. Resistance to adversarial prompting task may involve evaluating the ability of the LVLM model to withstand malicious attempts to elicit harmful or inappropriate responses. The disclosed LVLM has demonstrated greater resilience to adversarial prompting than previous LVLMs, suggesting that the disclosed training paradigm and feedback mechanism may effectively mitigate this vulnerability.

The small-sized VLM may be extensively fine-tuned to extract visual embeddings based on given instructions. Instruction-guided visual embedding may allow the LVLM to consider the instruction context when processing images, addressing the limitation of static image encoding. The LVLM model may be initially fine-tuned on a dataset of instructions and corresponding visual information. After instruction finetuning, the LVLM may be trained using a mix of conditional reinforcement learning and rejection sampling.

The disclosed techniques involve extracting visual embeddings that are context-aware and consider the given instructions. Instruction-guided visual embedding extraction may be achieved by fine-tuning a small-sized VLM with a linear projection layer, allowing the LVLM model to adapt its visual embedding extraction based on the specific instructions The disclosed techniques may allow the LVLM to interface with instructions and extract visual embeddings that align with these instructions.

Advantageously, instruction-guided visual embedding extraction may provide a significant improvement over the static approaches used in previous LVLMs. The small-sized VLM and the linear projector may be extensively fine-tuned during the training process, enabling the model to adapt and optimize the visual embedding extraction process.

The disclosed techniques may represent and process information from various modalities (like images, audio, etc.) through a common language-based interface. Expansibility may allow the LVLM to leverage pretrained LLMs and a wide range of pretrained multimodal models (X-Language Models), making it adaptable to different tasks and modalities. By representing all information in a language-based format, the disclosed techniques may more easily integrate and process information from different sources.

FIG. 1 is a block diagram illustrating example computing environment 10 for a LVLM employing instruction-guided visual embeddings and feedback-based learning, in accordance with one or more techniques of the disclosure. Computing environment 10 includes computing system 100, computing device 150, training data 122, and network 111. Computing device 150 may include a mobile computing device, such as a mobile phone (including a smartphone), a laptop computer, a tablet computer, a wearable computing device, or any other computing device. In the example of FIG. 1, computing device 150 stores multimodal data 152 and graphical user interface (GUI) 154. Multimodal data 152 may include a plurality of images from the real world, such as, but not limited to, photos, paintings, or illustrations. A plurality of images in the multimodal data 152 may depict a wide range of scenes, objects, and people. Multimodal data 152 may also include one or more synthetic images. For example, synthetic images may be images generated by computer programs, often using techniques like 3D rendering or generative models. Synthetic images may be used to create controlled datasets with specific characteristics.

GUI 154 may include a user interface associated with functionality of computing device 150. For example, GUI 154 of FIG. 1 may be a user interface for a software application associated with a LVLM, such as LVLM 102. Although illustrated in FIG. 1 as internal to computing device 150, GUI 154 may generate output for display on an external display device. In some examples, GUI 154 may provide an option for a user of computing device 150 to input multimodal data 152, such as visual data (images) and textual data (prompt/query). GUI 154 may provide an option for a user of computing device 150 to input multimodal data 152 to LVLM 102, which may output textual descriptions, answers to visual queries, or generated images based on text included in multimodal data 152. Although described as a graphical user interface, GUI 154 may represent any type of interface by which a user of computing device 150 can perform operations attributed herein to GUI 154, such as a command line interface, a website or form, or some combination thereof.

Although illustrated as external to computing system 100, computing device 150 may be a component of computing system 100. Computing device 150 and computing system 100 may communicate via communication channel 111, which may include a network, such as the Internet, another public or private communications network, for instance, broadband, cellular, Wi-Fi, ZigBee, Bluetooth® (or other personal area network—PAN), Near-Field Communication (NFC), ultrawideband, satellite, enterprise, service provider and/or other types of communication networks, or other types of communication channels for transmitting data between computing systems, servers, and computing devices. Alternatively, or in addition, although not shown, computing system 100 may receive multimodal data 152 from a storage device that interfaces with computing system 100 and that stores multimodal data 152. Such storage devices may include a USB drive, a disk drive (e.g., solid state drive or hard drive), an optical disc, or other storage device or media.

Computing system 100 may represent one or more computing devices configured to execute LVLM 102. LVLM 102 may comprise VLM 112, one or more linear projectors 114 (also referred to herein as "linear projection layers 114"), and LLM 116. VLM 112 may include computer-readable instructions for understanding and processing both visual and textual information simultaneously. For example, VLM 112 may be trained on massive datasets of images and text, allowing VLM 112 to learn relationships between the two modalities. Small-sized VLM 112 may offer a more practical solution, as compared to large-scale VLMs, especially for devices with limited resources.

Traditional LVLMs typically employ a fixed image encoder to extract visual features from images. The fixed image encoder is often pretrained on large-scale datasets and remains unchanged during downstream tasks. The extracted visual features are then combined with textual information to perform various tasks. LVLM 102, on the other hand, introduces a more flexible architecture. LVLM 102 may incorporate linear projection layer 114 that may be fine-tuned along with the VLM 112. The linear projection layer 114 may act as a bridge between the visual features extracted by the fixed encoder and the VLM 112. Training data 122 may include a storage device configured to store at least feedback data, as described below.

LLM 116 may include computer-readable instructions for understanding and generating human language. LLM 116 may be trained on massive amounts of text data, which may allow LLM 116 to learn patterns, grammar, and semantics. LLM 116 may be trained on billions or even trillions of words, making LLM 116 very powerful. LLM 116 may be trained to generate a response to a visual query inputted by a user.

Computing system 100 may receive a request from computing device 150 to perform a query on multimodal data 152. Computing device 150 may output GUI 154 as a user interface with options for a user operating computing device 150 to input multimodal data 152. For example, computing device 150 may output GUI 154 that allows a user to input an image and input a question related to the image. In some instances, computing device 150 may retrieve, via network 111, at least a portion of multimodal data 152 (e.g., image data) from external sources such as the Internet. Computing device 150 may send, via network 111, multimodal data 152, which may include image data and one or more queries related to the image data, to computing system 100.

In accordance with the techniques described herein, computing system 100 may perform analysis of multimodal data 152. Computing system 100 may process multimodal data 152 to generate a response to the query inputted by a user. Computing system 100 may generate corresponding responses to user queries conditioned on NLF and, in some examples, account for human preferences, as described below in conjunction with FIG. 1.

In an example, a plurality of visual queries may be provided to LVLM 102. Each of the plurality of visual queries may include at least an image and a textual query related to the image. The following steps may be repeated for each of the plurality of the provided visual queries. The VLM 112 component of LVLM 102 may process the image to extract visual features. The output of VLM 112 may be passed through the linear projection layer 114 to align it with the input space of LLM 116. The combined visual and textual embeddings may be fed into the LLM 116. The LLM 116 may generate a textual response based on the processed visual query. A second LLM 216 (shown in FIG. 2) may evaluate the generated response against predefined criteria, such as helpfulness, honesty, and harmlessness. The second LLM 216 may provide feedback to the LVLM 102, indicating whether the response meets the criteria or needs improvement. The feedback may be in the form of scores, critique, and/or specific refinement suggestions. The aggregated feedback provided by the second LLM 216 for the plurality of visual queries may be used to fine-tune the LVLM 102. The feedback loop may help ensure that the generated responses are relevant, coherent, and accurate.

Figure 2:
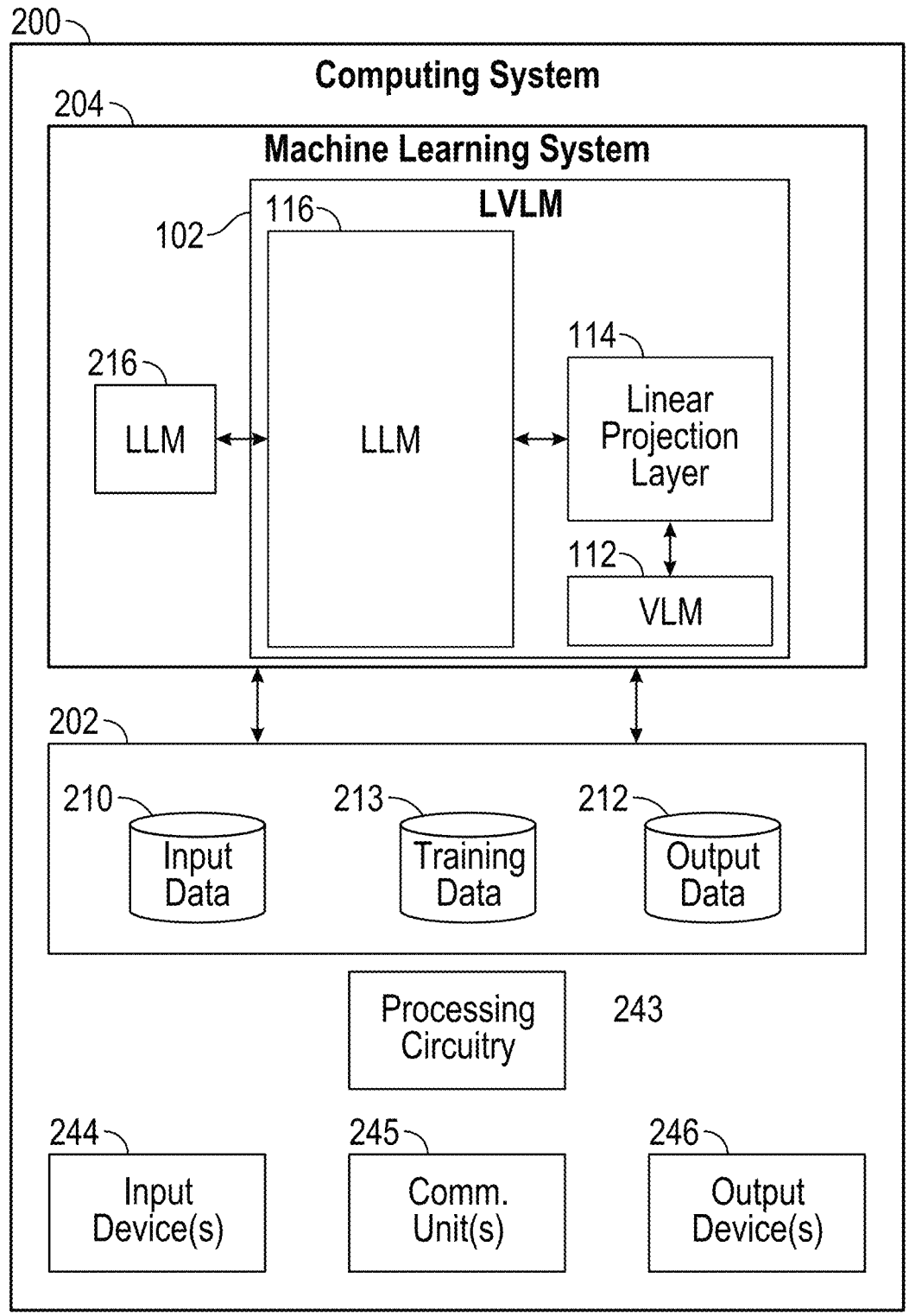
FIG. 2 is a detailed block diagram illustrating an example computing system, in accordance with the techniques of the disclosure.

FIG. 2 is a block diagram illustrating an example computing system 200. In an aspect, computing system 200 may represent computing system 100 shown in FIG. 1. Recent advancements in AI have witnessed a significant shift from traditional LLMs to Large Vision Language Models (LVLMs). LVLMs are capable of understanding and generating both text and visual information, making LVLMs valuable for a wide range of applications. As shown, computing system 200 includes processing circuitry 243 and memory 202 for executing a machine learning system 204 having a LVLM model 102 comprising a VLM 112, linear projection layer 114 and LLM 116. The LVLM model 102 may include any one or more of various types of LVLM models, such as, but not limited to, generative models, modular models, knowledge-based models, multi-modal models and the like.

Computing system 200 may be implemented as any suitable computing system, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 200 may represent a cloud computing system, a server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster. In some examples, at least a portion of system 200 is distributed across a cloud computing system, a data center, or across a network, such as the Internet, another public or private communications network, for instance, broadband, cellular, Wi-Fi, ZigBee, Bluetooth® (or other personal area network—PAN), Near-Field Communication (NFC), ultrawideband, satellite, enterprise, service provider and/or other types of communication networks, for transmitting data between computing systems, servers, and computing devices.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. Processing circuitry 243 of computing system 200 may implement functionality and/or execute instructions associated with computing system 200. Computing system 200 may use processing circuitry 243 to perform operations in accordance with one or more aspects of the present disclosure using software, hardware, firmware, or a mixture of hardware, software, and firmware residing in and/or executing at computing system 200. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Memory 202 may comprise one or more storage devices. One or more components of computing system 200 (e.g., processing circuitry 243, memory 202) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., LVLM model 102, LLM model 116, linear projection layer 114, VLM model 112), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 may include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, machine learning system 204 may receive input data from an input data set 210 and may generate output data 212. Input data 210 and output data 212 may contain various types of information, which will generally be tailored to the application/use case for the LVLM models. When used in the example system of FIG. 1, input data 210 may include an image. Other types of input data 210 may include various types of text including a prompt related to an image, a visual instruction, multi-modal data, and so forth. Output data 212 may include information such as, but not limited to, response to a prompt, question, visual instruction, and the like.

Machine learning system 204 may process training data 213 to train the LVLM 102, in accordance with techniques described herein. For example, a pretraining stage may involve training LVLM 102 on a massive amount of text and image data. The goal of the pretraining stage may be for LVLM 102 to learn general representations of language and vision. As other examples, training data 213 may come in the form of billions or even trillions of words, making the process of training LLM 116 of LVLM 102 very powerful. During training, machine learning system 204 may employ a two-stage training process.

As noted above, LLM 116 may be a large language model that has been trained on massive amounts of text data. LLM 116 may provide LVLM model 102 with a deep understanding of language and context. Small-sized pretrained VLM 112 may be a vision-language model that has been trained on a smaller dataset of images and text. VLM 112 may be more efficient computationally than larger models and may be well-suited for tasks that require real-time processing. Linear projection layer 114 may be a layer that connects the LLM 116 and the VLM 112. Linear projection layer 114 may be responsible for projecting the visual features (embeddings) extracted by the VLM 112 into a space that is compatible with the language embeddings of the LLM 116. The VLM 112 may process the input image and may extract one or more visual features of the input image.

Advantageously, the extracted visual features may be passed through the linear projection layer 114. According to the disclosed techniques, linear projection layer 114 may transform the extracted visual features into a space that is compatible with the language embeddings of the LLM 116. In one non-limiting example, the LLM 116 may process the input instruction and may generate a language embedding.

The projected visual features may be combined with the language embedding by linear projection layer 114 to create a joint representation. A byproduct of the disclosed techniques is that the joint representation may be used to perform the desired task, such as image captioning or visual question answering, as described below.

In an example, unlike conventional LVLMs that use fixed image encoders, architecture of LVLM 102 may allow for extensive fine-tuning of the small-sized VLM 112 with the linear projection layer 114. In other words, LVLM 102 may adapt its visual embeddings to the specific instructions provided, leading to more accurate and relevant results.

In one non-limiting example, by fine-tuning the linear projection layer 114, LVLM 102 may learn to extract visual features that are more aligned with the given instruction. Instruction-guided visual embedding extraction may help to mitigate the limitations of static visual embeddings that may not always be relevant to the task at hand.

As noted above, the machine learning system 204 may employ a Reinforcement Learning from LLM (AI) Feedback (RLAIF) training paradigm that may further refine the ability of LVLM 102 to generate high-quality responses that are aligned with human preferences. In an aspect, machine learning system 204 may use human-annotated dense captions as ground truth examples to evaluate the generated responses of LVLM 102. In the example illustrated in FIG. 2, the machine learning system 204 may employ one or more LLMs 216 that may evaluate the generated responses of the LVLM 102 based on these human-annotated captions. During evaluation of the generated responses, LLM 216 may provide both scalar rewards (e.g., 0-1 scores) and textual feedback (e.g., comments on helpfulness, honesty, and harmlessness). The VLM 112 and/or the LLM 116 may be updated based on the feedback of LLM 216, using reinforcement learning techniques to improve behavior of LVLM 102. The evaluation of LLM 116 of fine-grained attributes may help to identify and address issues like hallucinations and lack of helpfulness. Conditional RL technique may allow LVLM 102 to learn to generate responses that are conditioned on specific inputs (e.g., images and instructions).

One of the tasks performed by LVLM 102 may involve answering questions about images without relying on specific training data 213. Advantageously, LVLM 102 may outperform conventional LVLMs on this task. Such improvement in the performance may be due to ability of LVLM 102 to effectively combine visual and textual information, and understanding of context and instructions. Adversarial prompting involves designing inputs that are intended to mislead or confuse the model. Essentially, LVLM 102 may show a higher degree of resistance to adversarial prompting compared to exiting LVLMs. Such resilience of LVLM 102 may be due to robust training paradigm of LVLM 102 and ability of LVLM 102 to learn from human feedback.

Metrics like, but not limited to, accuracy, F1-score, and BLEU (BiLingual Evaluation Understudy) score may be used to quantitatively assess the performance of LVLM 102.

The core idea of the disclosed techniques is to address the shortcomings of previous models through two key design elements: architectural innovations and training paradigm improvements. Unlike traditional LVLMs that use fixed image encoders, the disclosed techniques incorporate linear projection layer 114 that may be fine-tuned along with the small-sized VLM 112. Dynamic image encoding may allow LVLM 102 to adapt visual embeddings to specific instructions, improving alignment and context understanding. Architecture of LVLM 102 provides a direct interface of the pretrained LLM 116 with the small-sized pretrained VLM 112. Such interface may facilitate a seamless flow of information between the language and vision components, enhancing the ability of LVLM 102 to understand and generate coherent responses. LVLM 102 may employ an RLAIF stage after instruction fine-tuning. Human-annotated dense captions may be used to evaluate the responses of VLM 112, providing the VLM 112 with more accurate feedback. RLAIF may help LVLM 102 align with human preferences and reduce hallucinations. LVLM 102 may use a combination of conditional RL and rejection sampling to improve robustness of the model against adversarial prompting and other vulnerabilities. In an example, conditional RL and rejection sampling may ensure that LVLM 102 generates high-quality responses even in challenging conditions.

Figure 3:
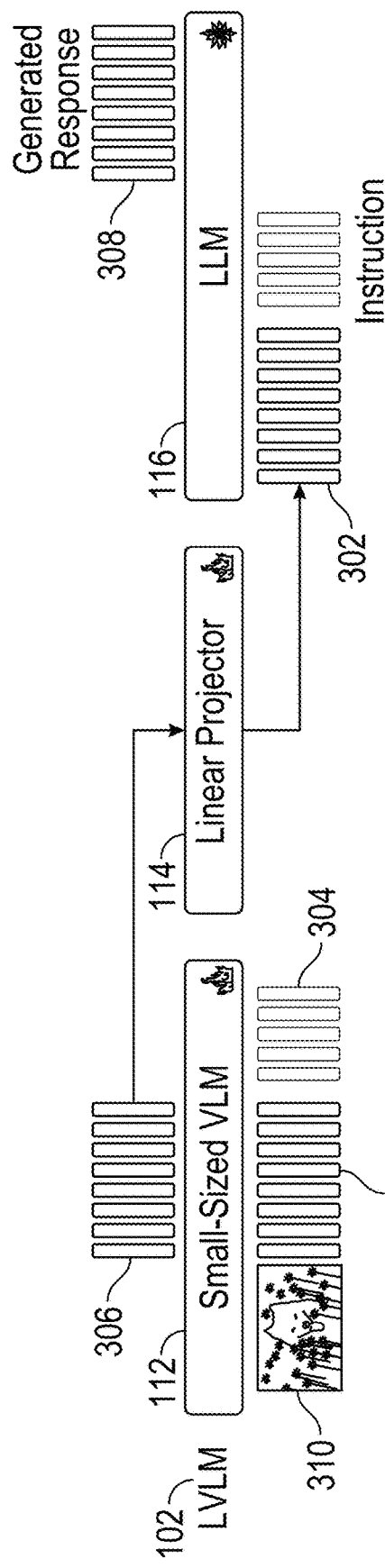
FIG. 3 illustrates an example architecture of a LVLM model, in accordance with the techniques of this disclosure.

FIG. 3 illustrates an example architecture of a LVLM model, in accordance with the techniques of this disclosure. LVLM 102 marks a departure from traditional LVLMs by introducing instruction-guided visual embedding extraction.

Many conventional LVLMs like BLIP2 (Bootstrapping Language-Image Pretraining), LLaVa (Language-to-Image Visual Assistant), InstructBLIP, and miniGPT4 (Generative Pre-trained Transformer) typically follow a two-step training process. The LLM may be trained on a massive dataset of image-caption pairs. A powerful vision model (e.g., CLIP, ViT) may be used to extract visual features from the images. The LLM may be further fine-tuned on a dataset of visual instructions and corresponding responses. Task-specific adaptation step may help the LLM to learn how to follow specific visual instructions and generate relevant responses, such as response shown in FIG. 4.

BLIP2 models are known for strong performance in image captioning and visual question answering, BLIP2 may leverage the power of CLIP for visual feature extraction. A multimodal foundation model, LLaVa excels at various tasks such as image captioning, visual question answering, and text-to-image generation. Instruct BLIP is a LVLM model that is specifically designed for instruction following tasks, making it particularly effective for applications like visual search and object recognition. miniGPT4 is a smaller and more efficient version of GPT-4. The miniGPT4 model offers a good balance between performance and computational cost.

LVLMs have opened up new possibilities in various fields, including, but not limited to: computer vision, natural language processing and robotics. The LVLM techniques may help with image captioning, object detection, and visual search tasks of computer vision. LVLM models may also help with machine translation, summarization, and text generation of natural language processing tasks. Finally, LVLM models may also assist with visual navigation, object manipulation, and human-robot interaction tasks of robotics.

While conventional LVLMs have made significant strides, there are still two primary limitations that need to be addressed. LVLMs may sometimes generate responses that are irrelevant, inaccurate, or even harmful. This misalignment with human preferences may lead to negative user experiences and undermine the credibility of LVLM model.

Conventional LVLMs may extract visual embeddings without considering the specific context or instructions provided. Context-agnostic encoding may lead to misalignment between the extracted features and the desired task. The fixed nature of the image encoder may restrict the ability of LVLM to adapt to different instructions and scenarios.

In contrast, architecture of LVLM 102 illustrated in FIG. 3 may allow LVLM 102 to dynamically adjust its visual embeddings based on the provided instructions 304. Instruction-guiding encoding may ensure that the extracted features 306 are relevant to the task at hand.

LVLM 102 employs novel techniques to LVLMs by combining a pretrained LLM 116 with a small-sized VLM 112 through linear projection layer 114. The architecture illustrated in FIG. 3 addresses the limitations of existing LVLM models by: instruction-guided visual embedding extraction and enhanced flexibility and adaptability. The linear projection layer 114 may allow the VLM model 112 to interface with instructions 304, guiding the extraction of visual embeddings 306 that are relevant to the given task. Instruction-guided visual embedding 302 extraction is a significant improvement over the static methods used in previous LVLMs. By training the small-sized VLM 112 and the linear projector 114 together, LVLM 102 may adapt and optimize the visual embedding extraction process. Such training paradigm may make the LVLM 102 more flexible and adaptable to different tasks and instructions.

In accordance with the techniques of this disclosure, the foundational design of LVLM 102 is based on the principle of "language as the unified interface." In other words, LVLM 102 may use language as a common medium to represent and process information from different modalities. By focusing on different modalities, LVLM 102 may transcribe various modalities (e.g., images, audio) into the language modality. Modality transcription may allow LVLM 102 to leverage the powerful capabilities of LLMs for understanding and processing information from these different sources. The "language as the unified interface" techniques may make LVLM 102 highly expandable. LVLM 102 may easily incorporate pretrained LLMs 116 and X-Language Models (models trained on different modalities) to handle new tasks or modalities.

By using language as a common medium, LVLM 102 may leverage the efficiency and effectiveness of LLM 116 for various tasks. The ability of LVLM 102 to incorporate different X-Language Models may make LVLM 102 highly adaptable to new challenges and domains.

The disclosed techniques introduce a three-stage training paradigm to address the limitations of previous LVLMs: pretraining, Supervised Fine-Tuning (SFT) and RL.

This initial pretraining stage may involve training LVLM 102 on a massive amount of text and image data. The goal of the pretraining stage may be for LVLM 102 to learn general representations of language and vision.

In an example, in the SFT stage, LVLM 102 may be fine-tuned on specific tasks using labeled datasets. In one example, the SFT may help LVLM 102 learn to perform specific tasks like image captioning or visual question answering. Advantageously, as used in the disclosed techniques, RL may further calibrate the responses 308 of LVLM 102 by incorporating human feedback. Human experts may provide feedback on the generated responses 308 of LVLM 102.

This feedback provided by humans may include, but is not limited to, ratings, comments, or specific examples of incorrect or harmful content. A reward function may be defined to quantify the quality of the responses 308 of LVLM 102 based on the human feedback. This reward function may be based on metrics like, but not limited to, accuracy, relevance, and helpfulness. LVLM 102 may be trained using reinforcement learning techniques to maximize the reward function. Such learning may involve iteratively generating responses 308, receiving feedback, and updating the parameters of LVLM 102. By incorporating human feedback through reinforcement learning, LVLM 102 may better align responses 308 with human preferences and values. The RL stage may help to identify and mitigate harmful, hallucinated, and unhelpful content in the responses 308 of LVLM 102.

In one non-limiting example, machine learning system 204 may employ LLaVA multimodal instruction tuning suite and GPT-4. The LLaVA multimodal instruction tuning suite may provide a rich dataset of images 310 paired with corresponding instructions 304 and questions 312. The images 310 in LLaVA may be sourced from the COCO dataset, which may include detailed annotations. The COCO dataset allow LLM 116 to effectively understand the visual content. GPT-4, a powerful LLM 216, may be used to provide feedback on the generated responses 308 of LVLM 102. The feedback of GPT-4 may be designed to mimic human judgments. The detailed annotations in the COCO dataset may enable GPT-4 to effectively understand the images 310. Previous studies have demonstrated the effectiveness of LLMs for annotation tasks. Using GPT-4 for feedback may be more cost-effective than relying solely on human annotations. GPT-4 may provide additional feedback that complements human annotations, further improving performance of LVLM 102.

In one non-limiting example, $D_{r}$ may be a subset of the LLaVA suite that may be set aside for training the LVLM model 102. The $D_{r}$ may ensure that the LVLM model 102 is trained on a separate dataset from the one used to fine-tune the LVLM model 102. In this example, three distinct LVLM models 102 may be used. Each LVLM model 102 may be initialized with a different checkpoint, varying the pretraining steps. Separate checkpoints may introduce diversity and may help to avoid overfitting.

All three models may undergo supervised fine-tuning (SFT) on the LLaVA suite. For each instruction and image in $D_r$, all three LVLM models 102 may generate responses 308. Instead of using pairwise comparison, LLM 216 (GPT-4 in this case) may be prompted to provide feedback for each individual response 308. It should be noted that LLM 216 feedback may allow for a more nuanced evaluation of the responses 308.

Training three distinct LVLM models 102 with different checkpoints may introduce diversity, which may improve the generalization ability of LVLM 102.

By having the LLM 216 provide feedback for each response 308, LVLM 102 may obtain a more comprehensive understanding of the strengths and weaknesses of VLM 112.

In an example, the described herein training paradigm of LVLM 102 may incorporate a fine-grained feedback modeling technique to specialize the evaluation of generated responses of LVLM 102. The disclosed techniques may involve considering at least two aspects: helpfulness and honesty. As used herein, the term "helpfulness" refers to the relevance and usefulness of the generated response 308 to the given instruction 304 or question 312. A helpful response 308 may provide accurate, informative, and relevant information.

LLM evaluator (e.g., LLM 216) of LVLM 102 may assess the helpfulness of generated responses 308 based on two primary criteria: 1) practical and beneficial information and 2) information that pertains exclusively to the user's question 312. LLM 216 may evaluate whether the response 308 provides useful and relevant information about the image 310 that aligns with the query 312 of the user. In an example, such evaluation may involve assessing the accuracy and completeness of the content, and relevance to the needs of the user.

As used herein, the term "honesty" refers to the extent to which a generated response (e.g., response 308) is aligned with the visual content of the given image. The LLM 216 may evaluate honesty by determining whether the response 308 includes elements that do not exist in the image 310.

Generally, the LLM 216 may check if the response 308 describes visual elements that are not present in the image 310. Hallucinated visual content may include, but is not limited to, objects, colors, or scenes that are not supported by the visual evidence.

LVLM 102 may employ two different prompts to guide the LLM 216 in providing feedback on generated responses 308. An example of the prompt for helpfulness evaluation may outline the scoring criteria and may instruct the LLM 216 to: generate reasons for the score, provide a rating, offer feedback for improvement. A similar prompt may be used for honesty evaluation, focusing on the alignment between the response 308 and the visual content of the image 310.

Some experiments show that generating reasons for scoring (chain-of-thought reasoning) may significantly improve the accuracy of the ratings of LLM 216. In one implementation, the accuracy may be improved because the LLM 216 may better articulate its reasoning process, leading to more consistent and reliable evaluations.

In addition to scalar ratings, LLM 216 may also generate textual feedback to provide more detailed insights into the quality of the generated responses 308. This textual feedback may be used in two ways: training phase and inference phase. Textual feedback may provide valuable information about the strengths and weaknesses of the response 308. The LLM 216 may explicitly point out missing visual concepts or other shortcomings in the response 308. During inference phase, textual feedback may be used to suggest ways to improve the generated response 308. In other words, LVLM 102 may regenerate the response 308 by considering both the previous version and the feedback of LLM 216. In one non-limiting example, textual feedback may provide more granular information than scalar ratings, allowing the LVLM 102 to learn more effectively. By incorporating textual feedback, LVLM 102 may generate responses 308 that are more accurate, relevant, and helpful.

Additionally, the disclosed techniques may focus on three dimensions: harmlessness, helpfulness and honesty. Harmlessness may measure the potential for the response 308 to cause harm, such as, but not limited to, spreading misinformation or promoting harmful stereotypes. In an example, helpfulness may assess the usefulness and relevance of the response 308 to the given instruction 304 or question 312. According to the disclosed techniques, honesty may evaluate the alignment between the response 308 and the visual content of the image 310.

In many traditional machine learning tasks, a reward model is used to guide the learning process. The reward model typically assigns a numerical value to each action or output, indicating how good or bad it is. The goal is to maximize the reward. Advantageously, the disclosed techniques essentially eliminate the need for an explicit reward model. Instead of a reward model, the LVLM 102 may be trained based on feedback generated by LLM 216. As noted above, LLM 216 may provide critiques on the outputs of LVLM 102, focusing on dimensions like harmlessness, helpfulness, and honesty. LVLM 102 may learn to adjust generated responses based on this feedback, gradually improving alignment of the generated responses with the desired qualities. Training a reward model may be expensive and time-consuming. By eliminating this step, the disclosed techniques become more cost-effective.

By considering multiple dimensions, LVLM 102 may provide a more comprehensive evaluation of response quality.

In this case evaluation of harmlessness by LVLM 102 may be decoupled from the image 310 content, allowing such evaluation to be outsourced to a specialized harmlessness detector. The disclosed techniques may have several advantages: efficiency, modularity and flexibility.

By focusing on a specific task, the harmlessness detector may be optimized for efficiency and accuracy. The harmlessness detection component may be easily replaced or updated without affecting the rest of the model.

The disclosed techniques may allow for the integration of different harmlessness detection techniques. In the illustrated example, LLM 216 may be used to perform the role of the harmlessness detector. The LLM 216 may be provided with a concrete task instruction to identify harmful content in the generated responses 308. The disclosed techniques may leverage the ability of LLM 216 to understand and process language, making LLM 216 well-suited for this task. In an aspect, for verification, LLMs 216 may be adapted to detect a wide range of harmful content, including, but not limited to: hate speech, misinformation, and toxic language. In this example, LLMs 216 may be continuously improved by training LLMs 216 on new data and incorporating new techniques.

During training, LVLM 102 may employ a two-stage training process. LLM 216 feedback data may be collected for each generated response 308, including scalar ratings and textual feedback.

The aforementioned attention to detail may help to identify and address potential issues in the generated responses 308.

As noted above, by incorporating human-centric evaluation criteria, feedback mechanism of LVLM 102 may help to ensure that the generated content aligns with human values and expectations.

The comprehensive assessment process may help to identify and mitigate issues like hallucinations and unhelpful content, improving the overall quality of the generated responses 308.

Traditionally, in the context of LVLMs, resilience is important to ensure that the model is robust against malicious attacks and may maintain its performance in challenging environments. Adversarial prompting, a technique used to mislead or manipulate LLMs, is a significant threat to integrity and security of LVLMs. The disclosed techniques propose employing conditional Reinforcement Learning (RL). Conditional RL may allow LVLM 102 to learn to generate responses 308 that are conditioned on specific inputs, such as, but not limited to, instructions 304 or images 310. As noted above, conditional RL may make LVLM 102 more adaptable and less susceptible to adversarial attacks. Conditional RL may be used to improve the performance of LVLM 102 on specific tasks, further enhancing resilience of LVLM 102. Rejection sampling may involve rejecting generated responses 308 that are deemed to be low-quality or unsafe. Rejection sampling may help to maintain the quality and reliability of the output of LVLM 102. Rejection sampling may be used as a defense mechanism against adversarial attacks. By rejecting malicious inputs, LVLM 102 may prevent the malicious inputs from influencing behavior of LVLM 102. The combination of conditional RL and rejection sampling may provide LVLM 102 with a robust defense against adversarial prompting and other vulnerabilities. By rejecting low-quality responses, LVLM 102 may produce higher-quality output.

RLAIF (Reinforcement Learning from AI Feedback) paradigm employed by LVLM 102 may offer a significant advancement in the field of LVLMs. By combining reinforcement learning, human-aligned fine-tuning, and extensive feedback, LVLM 102 may address several weaknesses found in conventional LVLM models.

The techniques disclosed herein ensure that the responses 308 of LVLM 102 are aligned with human preferences and avoid harmful or misleading content. By incorporating human feedback and reinforcement learning, LVLM 102 may be better equipped to handle adversarial prompts and other threats to integrity of LVLM 102. Training paradigm of LVLM 102 may be designed to be efficient and scalable, allowing for rapid development and deployment.

Figure 4:
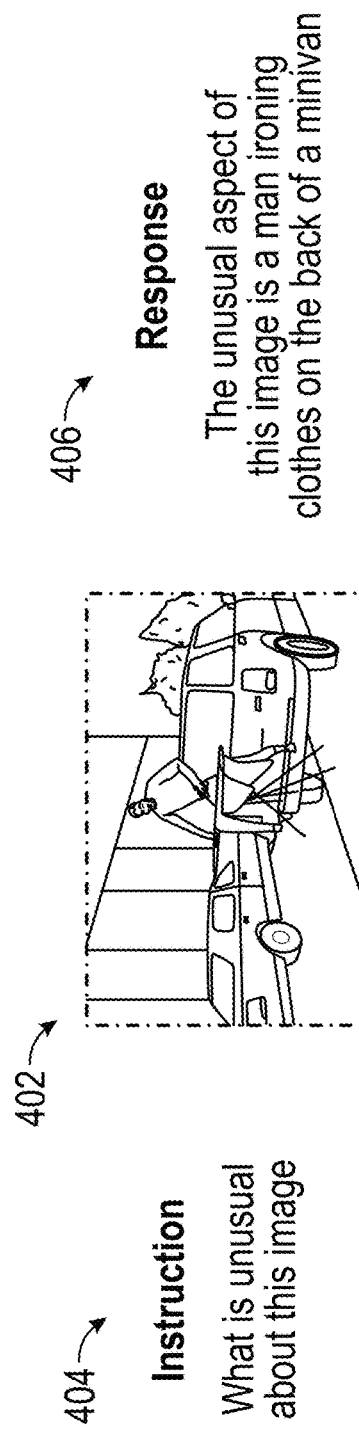
FIG. 4 illustrates an example of a helpful output response that may be generated by a LVLM model, in accordance with the techniques of the disclosure.

FIG. 4 illustrates an example of an input image 402 and visual instruction 404 and an output response 406 that may be generated by LVLM model 102, in accordance with the techniques of the disclosure.

In this case, the generated response 406 may be helpful, honest and unharmful. In an aspect, to generate response 406, LVLM 102 may need to be trained on more diverse and representative datasets, and responses of LVLM 102 may be carefully evaluated and refined to ensure the responses 406 align with human values and expectations. The training data 213 for many LVLMs may lack strong coherence between conversation turns, limiting the ability of LVLM to maintain context and engage in meaningful multi-turn interactions.

FIG. 5 illustrates an example of an input image 502 and prompt 504 and a harmful output response 506 that may be generated by a LVLM model. More specifically, FIG. 5 illustrates responses 506 generated by LLaVA and Instruct BLIP models. Without a strong understanding of the conversation history, LVLMs may struggle to use prior context to improve their responses, leading to repetitive or irrelevant statements.

Reinforcement Learning from Human Feedback (RLHF) is a common approach to align LLMs with human preferences. However, RLHF faces several challenges.

RLHF involves collecting human ratings for a large number of generated responses, which may be time-consuming and expensive. Relying solely on human ratings may introduce biases and limitations due to the subjectivity of human judgment. To address the aforementioned challenges, LVLM 102 may employ novel techniques: Reinforcement Learning from AI Feedback (RLAIF). The RLAIF may leverage an LLM to provide feedback on generated responses, eliminating the need for direct human ratings.

RLAIF may be more efficient than traditional RLHF, as RLAIF does not require constant human input. RLAIF may be applied to large-scale models and datasets. By using LLM 216 for feedback, LVLM 102 may potentially mitigate some of the biases inherent in human judgment.

One of the primary challenges in improving the interaction ability of LVLMs is the lack of coherence between utterances in multi-turn interactions within existing datasets. This limitation may hinder the ability of LVLMs to maintain context and engage in meaningful conversations. LVLM 102 may address the aforementioned challenge by categorizing natural language feedback into two distinct categories. Critique category may encompass feedback that highlights shortcomings or errors in the generated response. Refinement category may include feedback that suggests improvements or modifications to the response.

By categorizing feedback in this way, LVLM 102 may better understand the specific areas where the model needs to improve and tailor its training accordingly. In an example, LVLM 102 may also employ a generate-annotate framework to systematically create useful multi-turn interaction data.

The LLM 116 may generate responses to a given prompt or question. Human annotators may categorize the generated responses into critique and refinement categories. The aforementioned process may be repeated iteratively, with the LLM 116 learning from the annotations and generating improved responses over time.

LVLM 102 may integrate Reinforcement Learning from AI Feedback (RLAIF) to address the limitations of existing LVLMs. By incorporating natural language feedback from LLMs 216, LVLM 102 may improve at least two aspects. In an example, the LLM 216 may provide specific and actionable feedback on generated responses 308, guiding the LVLM 102 towards more human-aligned outputs. LVLM 102 may use the feedback provided by LLM 216 to iteratively refine responses 308, ensuring the responses 308 are consistent with human values and expectations. Natural language feedback may help LVLM 102 better understand the context of conversations, leading to more coherent and engaging interactions. By analyzing feedback, LVLM 102 may adapt the responses 308 to different users and situations, fostering more personalized and satisfying interactions. RLAIF may eliminate the need for human annotators, making the training process more efficient and scalable. LLM 216 may provide feedback in real-time, allowing LVLM 102 to continuously improve performance.

For example, LVLM 102 may perform a categorization of NLF into two primary categories. Critique feedback may highlight the specific strengths and weaknesses of the response 308 generated by LVM 112. Critique feedback may include identifying areas where the response is informative, accurate, or relevant, as well as areas where the response 308 (e.g., responses 506 shown in FIG. 5) is lacking or incorrect. Refinement feedback may offer specific suggestions on how the LVLM 102 may improve its response. In other words, refinement feedback may involve providing concrete examples, suggesting alternative phrasings, or pointing out missing information. Additionally, by carefully categorizing NLF, LVLM 102 may transform the NLF into more coherent multi-turn interactions, further enhancing the interaction capabilities of LVM 112.

LVLM 102 may analyze the critique and refinement feedback to identify common patterns or themes. LVLM 102 may develop new prompts or questions based on the identified patterns, focusing on areas where the LVLM 102 struggled or could improve.

Natural Language Feedback (NLF) may provide valuable insights into the quality of generated responses. By incorporating NLF into the conditional RL algorithm, LVLM 102 may significantly enhance the ability of the LVLM 102 to generate human-aligned and informative outputs. To effectively incorporate NLF into the conditional RL algorithm, LVLM 102 may need to be trained to generate responses 308 that are conditioned on the specific NLF provided. The NLF may be converted into a suitable representation that may be processed by the LVLM 102 (e.g., embedding). The NLF representation may be concatenated with the input prompt 312 or image 310 to create a combined input. In this context, LVLM 102 may be trained to generate responses 308 based on this combined input. LVLM 102 may learn to distinguish between good and bad responses 308 through the reward function used in the RL algorithm. By associating positive rewards with high-quality responses 308 and negative rewards with low-quality responses 308, LVLM 102 may gradually learn to generate more desirable outputs.

Meta-learning may be employed to further enhance the ability of LVLM 102 to generate high-quality responses 308. Meta learning may involve training LVLM 102 to learn how to learn from new data and adapt to different scenarios. By meta-learning, LVLM 102 may become more flexible and adaptable, improving its performance over time. By incorporating NLF, LVLM 102 may better align responses of LVLM 102 with human expectations. NLF may provide valuable context that helps the model generate more relevant and informative responses.

Figure 6:
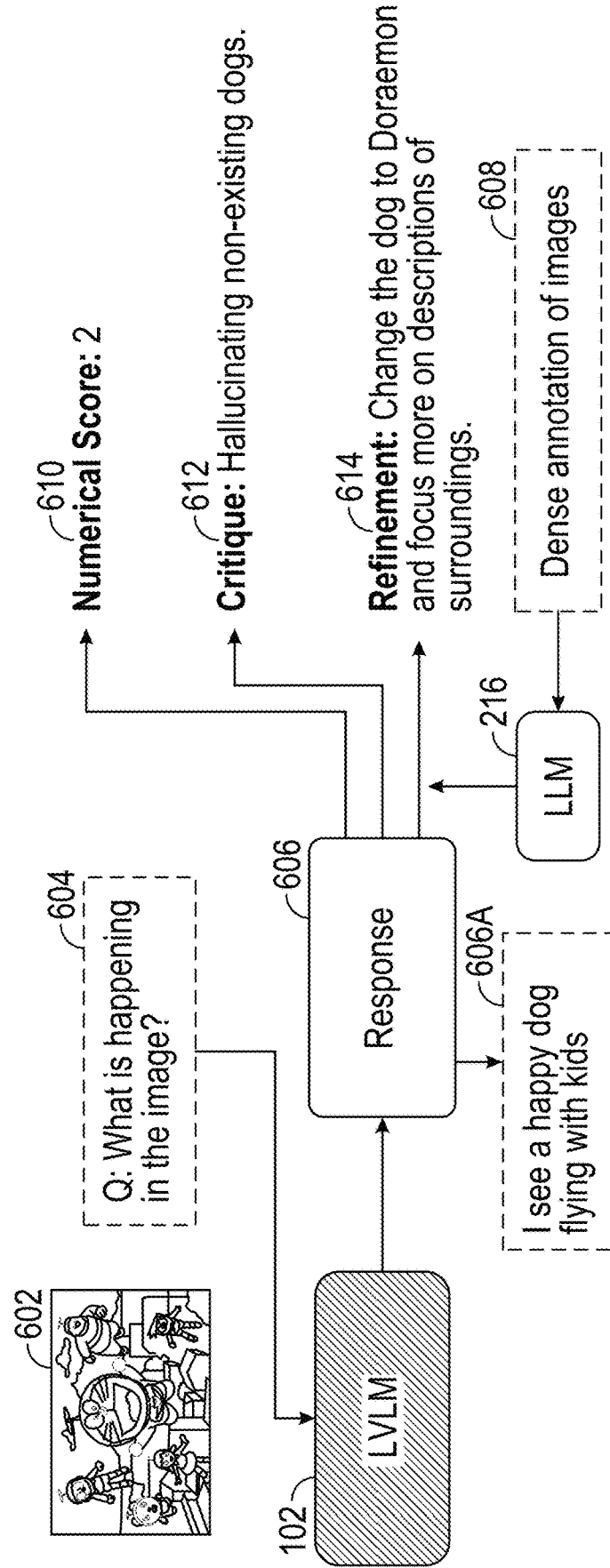
FIG. 6 is a detailed block diagram illustrating an example of Natural Language Feedback (NLF) annotation performed by a LLM, in accordance with the techniques of the disclosure.

FIG. 6 is a detailed block diagram illustrating an example of Natural Language Feedback annotation performed by a LLM, in accordance with the techniques of the disclosure. As shown in FIG. 6, LVLM 102 may receive a combined input. The combined input may include an image 602 (e.g., a visual representation of a scene or object) and a prompt/query 604 (a textual description or question related to the image 602). In an aspect, the LVLM 102 may process the combined input, combining the visual and textual information to create a unified representation, as described above. Based on this representation, the LVLM 102 may generate a response 606, such as response 606A (e.g., "I see a happy dog flying with kids."). The LLM 216 may be trained on dense annotations of the images 608 as input, to provide additional context and information. As shown in FIG. 6, the LLM 216 may generate Natural Language Feedback (NLF) consisting of: numerical score 610, critique 612 and refinement 614. Numerical score 610 may be a quantitative rating of the response 608 of LVLM 102 (e.g., 2 out of 5). Critique 612 may be specific feedback on the shortcomings of the response 606 (e.g., "hallucinating non-existing dogs"). Refinement 614 may include, but is not limited to, suggestions for improving the response 606 (e.g., "Change the dog to Doraemon and focus more on descriptions of surroundings"). In this example, the LVLM 102 may use this feedback 610-614 to improve its future responses.

In an example, during pretraining, 8 million image-caption pairs may be used as input. The goal of pretraining may be to train a strong captioner LVLM 102 that may accurately describe images. During SFT, for example, LLaVA dataset (160,000 samples) may be used. The objective of SFT may be to align the linear projector 114 of LVLM 102 between visual and textual features, making the LVLM 102 capable of following instructions.

A well-trained LVLM 102 may generate accurate captions for images.

To collect feedback on performance of LVLM 102, a subset of, for example, 30,000 samples may be selected from the LLaVA dataset. This subset may be carefully filtered to ensure no duplicate images and that questions are answered solely based on the image. The subset containing no duplicate images may prevent LVLM 102 from learning biases or shortcuts based on repeated images.

Figure 7:
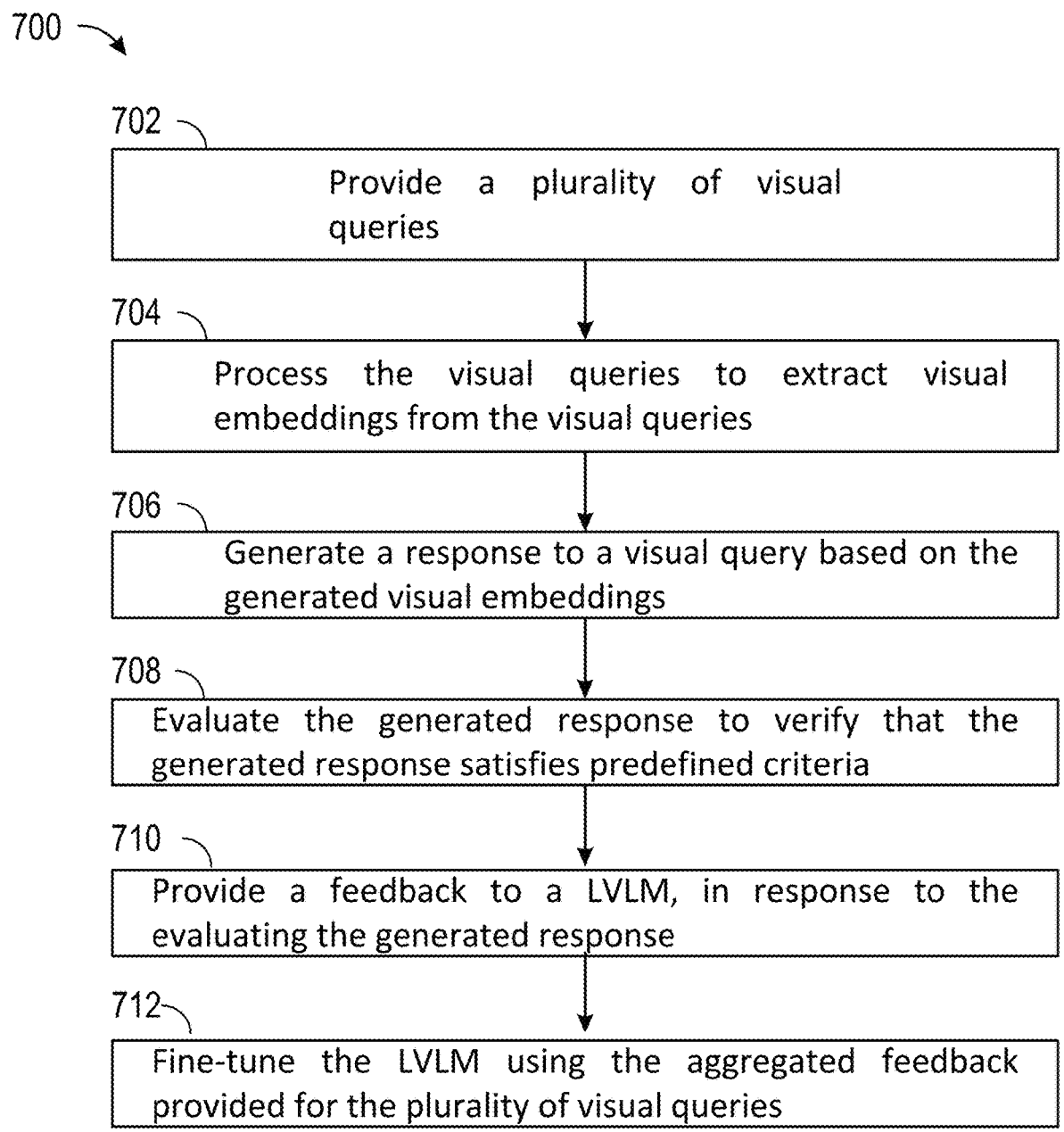
FIG. 7 is a flowchart illustrating an example mode of operation for a machine learning system, according to techniques described in this disclosure.

FIG. 7 is a flowchart illustrating an example mode of operation for a machine learning system, according to techniques described in this disclosure. Although described with respect to computing system 200 of FIG. 2 having processing circuitry 243 that executes machine learning system 204, mode of operation 700 may be performed by a computing system with respect to other examples of machine learning systems described herein.

In mode of operation 700, processing circuitry 243 executes machine learning system 204. Machine learning model 204 may providing a plurality of visual queries to LVLM 102 (702). In an example, the visual query may include at least an image and a textual query related to the image. Next, LVLM 102 may process the plurality of visual queries to extract one or more visual embeddings from each of the plurality of visual queries (704). The LVLM 102 may include a Visual Language Model (VLM) 112, a first Large Language Model (LLM) 116 and a linear projection layer 114 interconnecting the VLM 112 and the LLM 116. The VLM 112 may process the input image and may extract one or more visual features of the input image. LVLM 102 may generate a response to the visual query based on the generated one or more visual embeddings (706). In an aspect, machine learning system 204 may use human-annotated dense captions as ground truth examples to evaluate the generated responses of LVLM 102. A second LLM 216 may evaluate the generated response to verify that the generated response satisfies one or more predefined criteria (708). In an example, such evaluation may involve assessing the accuracy and completeness of the content, and relevance to the needs of the user. Next, the second LLM may provide a feedback to the LVLM, in response to the evaluating the generated response (710). This textual feedback may be used in two ways: a training phase and an inference phase. Textual feedback may provide valuable information about the strengths and weaknesses of the response 308. The LLM 216 may explicitly point out missing visual concepts or other shortcomings in the response 308. During inference phase, textual feedback may be used to suggest ways to improve the generated response 308. It should be noted that 706-710 may be repeated by the machine learning model 204 for each of the plurality of visual queries. The machine learning model 204 may fine-tune the LVLM 102 using aggregated feedback provided by LLM 216 for the plurality of visual queries (712). The generated feedback may offer specific suggestions on how the LVLM 102 may improve its response. In other words, the generated feedback may involve providing concrete examples, suggesting alternative phrasings, or pointing out missing information.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method for fine-tuning a Large Visual Language Model (LVLM), the method comprising:
   providing a plurality of visual queries, wherein each of the plurality of visual queries comprises at least an image and a textual query related to the image;
   processing, by the LVLM, the plurality of visual queries to extract one or more visual embeddings from each of the plurality of visual queries, wherein the LVLM comprises a Visual Language Model (VLM), a first Large Language Model (LLM), and a linear projection layer interconnecting the VLM and the LLM;
   for each of the plurality of visual queries:
   i) generating, by the LVLM, a response to the corresponding visual query based on the corresponding one or more visual embeddings;
   ii) evaluating, by a second LLM, the generated response to verify that the generated response satisfies one or more predefined criteria; and
   iii) providing, by the second LLM, a feedback to the LVLM, in response to the evaluating the generated response; and
   fine-tuning the LVLM using aggregated feedback provided by the second LLM for the plurality of visual queries.

2. The method of claim 1, wherein the one or more predefined criteria comprise at least one of helpfulness, honesty, and harmlessness.

3. The method of claim 1, wherein the feedback comprises a Natural Language Feedback (NLF).

4. The method of claim 3, wherein the feedback comprises at least a numerical score, critique feedback, and refinement feedback.

5. The method of claim 4, wherein the refinement feedback suggests improvements or modifications to the generated response.

6. The method of claim 3, further comprising training the LVLM using the NLF.

7. The method of claim 6, wherein training the LVLM further comprises:

training the LVLM using the NLF incorporated into a conditional Reinforcement Learning (RL) algorithm.

8. A computing system for fine-tuning a Large Visual Language Model (LVLM), the computing system comprising:
processing circuitry in communication with storage media, the processing circuitry configured to execute a machine learning system comprising the LVLM, the processing circuitry configured to:
provide a plurality of visual queries, wherein each of the plurality of visual queries comprises at least an image and a textual query related to the image;
process, by the LVLM, the plurality of visual queries to extract one or more visual embeddings from each of the plurality of visual queries, wherein the LVLM comprises a Visual Language Model (VLM), a first Large Language Model (LLM), and a linear projection layer interconnecting the VLM and the LLM;
for each of the plurality of visual queries:
 i) generate, by the LVLM, a response to the corresponding visual query based on the corresponding one or more visual embeddings;
 ii) evaluate, by a second LLM, the generated response to verify that the generated response satisfies one or more predefined criteria; and
 iii) provide, by the second LLM, a feedback to the LVLM, in response to the evaluating the generated response; and
fine-tune the LVLM using aggregated feedback provided by the second LLM for the plurality of visual queries.

9. The system of claim 8, wherein the one or more predefined criteria comprise at least one of helpfulness, honesty, and harmlessness.

10. The system of claim 8, wherein the feedback comprises a Natural Language Feedback (NLF).

11. The system of claim 10, wherein the feedback comprises at least a numerical score, critique feedback, and refinement feedback.

12. The system of claim 11, wherein the refinement feedback suggests improvements or modifications to the generated response.

13. The system of claim 10, the processing circuitry further configured to:
train the LVLM using the NLF.

14. The system of claim 13, wherein the processing circuitry configured to train the LVLM is further configured to:
train the LVLM using the NLF incorporated into a conditional Reinforcement Learning (RL) algorithm.

15. Non-transitory computer-readable storage media having instructions encoded thereon, the instructions configured to cause processing circuitry to:
provide a plurality of visual queries, wherein each of the plurality of visual queries comprises at least an image and a textual query related to the image;
process, by a Large Visual Language Model (LVLM), the plurality of visual queries to extract one or more visual embeddings from each of the plurality of visual queries, wherein the LVLM comprises a Visual Language Model (VLM), a first Large Language Model (LLM), and a linear projection layer interconnecting the VLM and the LLM;
for each of the plurality of visual queries:
 i) generate, by the LVLM, a response to the corresponding visual query based on the corresponding one or more visual embeddings;
 ii) evaluate, by a second LLM, the generated response to verify that the generated response satisfies one or more predefined criteria; and
 iii) provide, by the second LLM, a feedback to the LVLM, in response to the evaluating the generated response; and
fine-tune the LVLM using aggregated feedback provided by the second LLM for the plurality of visual queries.

16. The storage media of claim 15, wherein the one or more predefined criteria comprise at least one of helpfulness, honesty, and harmlessness.

17. The storage media of claim 15, wherein the feedback comprises a Natural Language Feedback (NLF).

18. The storage media of claim 17, wherein the feedback comprises at least a numerical score, critique feedback, and refinement feedback.

19. The storage media of claim 18, wherein the refinement feedback suggests improvements or modifications to the generated response.

20. The storage media of claim 17, the instructions further configured to cause processing circuitry to:
train the LVLM using the NLF.

* * * * *